United States Patent Office 3,487,059
Patented Dec. 30, 1969

3,487,059
PRODUCTION OF POLYMERIC ALCOHOLS BY THE THERMAL DECARBONYLATION OF POLYMERIC FORMATE ESTERS
Leo W. Tyran, Lewiston, N.Y., assignor to E. I. du Pont de Nemours and Company, Wilmington, Del., a corporation of Delaware
No Drawing. Filed Nov. 29, 1967, Ser. No. 686,694
Int. Cl. C08f 27/16, 27/00
U.S. Cl. 260—85.7                                 6 Claims

ABSTRACT OF THE DISCLOSURE

Polymeric alcohols are produced by the thermal decarbonylation of polymeric formate esters at temperatures of at least 140° C., e.g., 140 to 220° C. In particular, polyvinyl formate is heated at 140 to 220° C. to produce polyvinyl alcohol and carbon monoxide as a by-product.

CROSS-REFERENCE TO RELATED CASE

My co-pending application Ser. No. 686,727, filed Nov. 29, 1967, which discloses the production of polymeric alcohols by reacting a halogen-containing polymer having chlorine and/or bromine atoms on aliphatic carbon atoms with a metal formate to effect replacement of halogen atoms by formate groups, and converting the formate groups to hydroxyl groups by thermal decarbonylation.

BACKGROUND OF THE INVENTION

Polymeric alcohols, i.e., polymers containing hydroxyl groups, are useful as barrier coatings, films, binders, adhesives, textile sizes and in many other well-known applications. Polymeric alcohols such as, for example, homopolymers and copolymers of vinyl alcohol, are usually prepared by the partial or complete saponification, ammonolysis, hydrolysis or alcoholysis of corresponding polyesters, i.e., corresponding homopolymers or coplymers of vinyl esters of carboxylic acids. Examples of such polyesters are the homopolymers and copolymers of vinyl esters of formic, acetic, propionic and benzoic acids. Most generally, such polyesters are converted to the desired polymeric alcohols by catalyzed hydrolysis reactions.

The present invention relates to the conversion of polymeric formate esters to polymeric alcohols by a decarbonylation reaction which does not require any reactant other than the polymeric formate ester itself.

SUMMARY OF THE INVENTION

Polymeric alcohols are produced in accordance with the invention by heating a polymeric formate ester at a temperature of at least 140° C., which temperature is effective to cause the decarbonylation of the polymeric formate ester with the formation of a polymeric alcohol therefrom and the obtainment of carbon monoxide as by-product. In particular, a polyvinyl formate is heated at a temperature of 140 to 220° C. to effect its conversion to polyvinyl alcohol and carbon monoxide.

DETAILED DESCRIPTION AND PREFERRED EMBODIMENTS

The polymeric formate esters that may be employed as starting materials in practicing the method of the invention include the homompolymers of vinyl formate and the various copolymers of vinyl formate with other monomeric materials which are copolymerizable therewith. In fact, any polymeric material which contains formate radicals attached to the polymeric structure can be used. Examples of suitable starting polymeric formate esters are the various homopolymers of vinyl formate and the copolymers thereof with other unsaturated compounds which are copolymerizable with vinyl formate, e.g., ethylene and other 1-olefins, vinyl chloride, and the various vinyl esters of carboxylic acids such as acetic acid, propionic acid, butyric acid and benzoic acid. When the starting material is a copolymer of vinyl formate, the vinyl formate moiety of the copolymer should generally constitute at least 5% of the weight of the copolymer. Preferably, the starting material is a homopolymer of vinyl formate.

The conversion of the polymeric formate ester, e.g., polyvinyl formate, to the polymeric alcohol, e.g., polyvinyl alcohol, in accordance with the invention, requires heating the starting polymeric formate ester at a temperature sufficiently elevated to effect the thermal decarbonylation thereof. Generally, temperatures of at least 140° C. will be required and temperatures ranging from 140° C. to about 200° C. are generally operable. The temperature employed should not, of course, be high enough to effect breakdown of the polymer chain or to otherwise cause the breakdown of the polymer except for the conversion of formate groups to hydroxyl groups. The rate at which the desired decarbonylation reaction proceeds increases as the temperature is increased and usually temperatures of at least 160° C. are desirably employed in order to achieve decarbonylation at a practical rate. The preferred temperatures range from 160 to about 200° C.

Because of the difficulties involved in effectively supplying the heat required to effect the decarbonylation when employing the starting polymeric formate ester in the absence of other materials, e.g., in the dry state, it is preferred that the reaction be effected in the presence of a liquid medium which will not adversely affect the conversion to the desired polymeric alcohol. Liquids which may or may not be solvents for the polymeric formate ester and/or the polymeric alcohol product may be employed, which liquids function as heat-transfer media. Examples of such liquids are high-boiling alcohols such as tetrahydrofurfuryl alcohol, ethylene glycol, silicone oils, and liquid hydrocarbons such as kerosene, triethylbenzene, and the like. If the starting polymeric formate ester is soluble in the liquid employed, the conversion to the polymeric alcohol can simply be effected by heating a solution of the polymeric formate ester in the liquid at a temperature and for a time effective to bring about the desired decarbonylation. If the polymeric formate ester is not soluble in the liquid employed, it can simply be suspended or dispersed in the liquid and heated therein.

The invention is illustrated by the following examples:

EXAMPLE 1

A three-necked reaction flask provided with a reflux condenser, a stirrer, a thermometer and an electrically heated mantle was charged with 100 g. of tetrahydrofurfuryl alcohol having a water content of 0.065% by volume and 5 g. of polyvinyl formate in the form of small cubes. The charge was heated, with stirring, to reflux temperature (172 to 174° C.). The polyvinyl formate appeared to gel but did not dissolve in the tetrahydrofurfuryl alcohol. After heating for two hours, the mixture was allowed to cool gradually under mild agitation. A small amount of the fine precipitate of polyvinyl alcohol which had formed was removed and tested for its solubility in water. The test showed the precipitate to be somewhat soluble in cold water and almost completely soluble in hot water.

EXAMPLE 2

Seventy-five grams of ethylene glycol having a water content of 0.14% by volume was added to the reaction flask containing the mixture of Example 1, following which the mixture was reheated, with stirring, at 175 to 180° C. for an additional 4 hours. After cooling the mixture, the precipitated polyvinyl alcohol and unreacted polyvinyl formate were filtered out, washed three times with methanol and then dried in a vacuum oven at 65° C. for three hours. The dried crude product, weighing 4 g., was heated with 40 g. of water at 90° C. for 30 minutes and the resulting mixture was then filtered to remove water insoluble material. The polyvinyl alcohol content of the filtrate represented a 20% conversion of the starting polyvinyl formate to polyvinyl alcohol. Infrared scans of films cast from the filtrate resembled closely scans of a typical grade of completely alcoholyzed polyvinyl alcohol obtained by the catalytic methanolysis of polyvinyl acetate.

EXAMPLE 3

A reaction flask such as that employed in Example 1 was charged with 5 g. (0.073 mols) of polyvinyl formate and 150 g. of a 1:1 weight mixture of tetrahydrofurfuryl alcohol and ethylene glycol. The charge was then heated, with stirring, for 9 hours at 170 to 180° C. The polyvinyl alcohol product (1.37 g. or 0.031 mols) which was recovered as an aqueous solution as described in Example 2, represented a 42.6% conversion of the polyvinyl formate to polyvinyl alcohol. The polyvinyl alcohol product obtained was essentially free of formate groups. Since the starting charge contained only 0.14 g. (0.008 mols) of water whereas 0.56 g. (0.031 mols) of water would have been required had the polyvinyl alcohol product resulted from hydrolysis of the polyvinyl formate, it is evident that the conversion to polyvinyl alcohol was not achieved by the hydrolysis of the starting polyvinyl formate. The product polyvinyl alcohol was soluble in hot water and more than one fourth (27.7%) thereof was soluble in water at temperatures below 60° C.

EXAMPLE 4

The general procedure of Example 3 was repeated while there was inserted in the exit end of the reflux condenser a "Saf-CO-Meter" carbon monoxide indicating tube. During the conversion of the polyvinyl formate to polyvinyl alcohol, the indicator in the indicating tube changed from a yellow to a dark green-blue color demonstrating the continuous evolution of carbon monoxide from the reaction mixture during the course of the reaction.

EXAMPLE 5

The reaction flask of Example 1 was charged with 5 g. of polyvinyl formate and 150 g. of a dry silicone oil which was free of hydroxyl groups. The charge was heated, with stirring, at 180 to 200° C. for 30 minutes. The evolution of carbon monoxide from the charge during the conversion of the polyvinyl formate to polyvinyl alcohol was confirmed as described in Example 4.

The polyvinyl formate employed as starting material in the foregoing examples was prepared by the bulk polymerization of vinyl formate at −50° C. using triethyl boron as the polymerization initiator. It was insoluble in hot water and slightly soluble in hot formic acid and hot acetone. An infrared scan of a film cast from a formic acid solution of the polyvinyl formate showed absorption which was typical of a formate ester.

While it is preferred to carry out the decarbonylation of the polymeric formate ester in a liquid medium as illustrated in the above examples, it is possible to carry out the reaction in the dry state, e.g., in a kneader-type reactor. The reaction can be carried out in either the dry state or in a liquid medium in the absence of any reaction catalyst as shown by the above examples. However, if desired, materials which catalyze the reaction can also be present in the reaction medium. Various materials such as platinum and palladium and the like, and some metal carbonyls and certain soluble rhodium complexes, which are known to catalyze other decarbonylation reactions, are examples of such catalysts. The presence of effective catalysts of this type would be beneficial either in increasing the rate of reaction at a given temperature or in permitting the use of temperatures lower than otherwise might be necessary to achieve the desired reaction rate.

Generally, it will be preferred to carry out the conversion of the polymeric formate ester to the polymeric alcohol product in the substantial absence of water so as to obviate the necessity of removing water from the product when the polymeric alcohol product is to be recovered in dry form, as will usually be the case. Also, the presence of substantial amounts of water may possibly result in some hydrolysis of the polymeric formic ester with the undesirable formation of formic acid as a by-product. However, the presence of small amounts of water, generally not more than about 3% of the weight of the starting polymeric formate ester, is not objectionable since under those circumstances the desired decarbonylation reaction will usually proceed preferentially with little indication of hydrolysis of the starting ester occurring to any significant extent.

The method of the invention results in the coproduction of a polymeric alcohol, e.g., polyvinyl alcohol, and carbon monoxide. The latter can be recovered and used in any desired way. Thus, it can be converted to formic acid by known methods and the resulting formic acid can be used, for example, in the production of the vinyl formate precursor of the starting polymeric formate ester.

I claim:
1. The method comprising heating a polymeric formate ester which is a homopolymer of vinyl formate, or a copolymer thereof in which the vinyl formate moiety constitutes at least 5% of the weight of the copolymer, at a temperature of at least 140° C. for a time effective to convert said polymeric formate ester to a polymeric alcohol product and to produce carbon monoxide as a by-product.

2. The method according to claim 1 wherein the polymeric formate ester is heated at a temperature from 140 to 220° C.

3. The method according to claim 1 wherein the polymeric formate ester is heated in a liquid medium in the substantial absence of water at a temperature of 160 to 200° C.

4. The method according to claim 1 wherin the polymeric formate ester is polyvinyl formate.

5. The method according to claim 2 wherein the polymeric formate ester is polyvinyl formate.

6. The method according to claim 3 wherein the polymeric formate ester is polyvinyl formate.

References Cited

UNITED STATES PATENTS 3,222,338  12/1965  Fujii et al. _____ 260—89.1

FOREIGN PATENTS 322,157  11/1929  Great Britain.

JOSEPH L. SHOFER, Primary Examiner
STANFORD M. LEVIN, Assistant Examiner

U.S. Cl. X.R.
260—87.1, 87.3, 89.1, 91.3